Jan. 18, 1949.    W. L. HENDRICKS    2,459,224
MAGNETICALLY OPERATED STIRRER FOR MIXING LIQUIDS
Filed Aug. 17, 1946
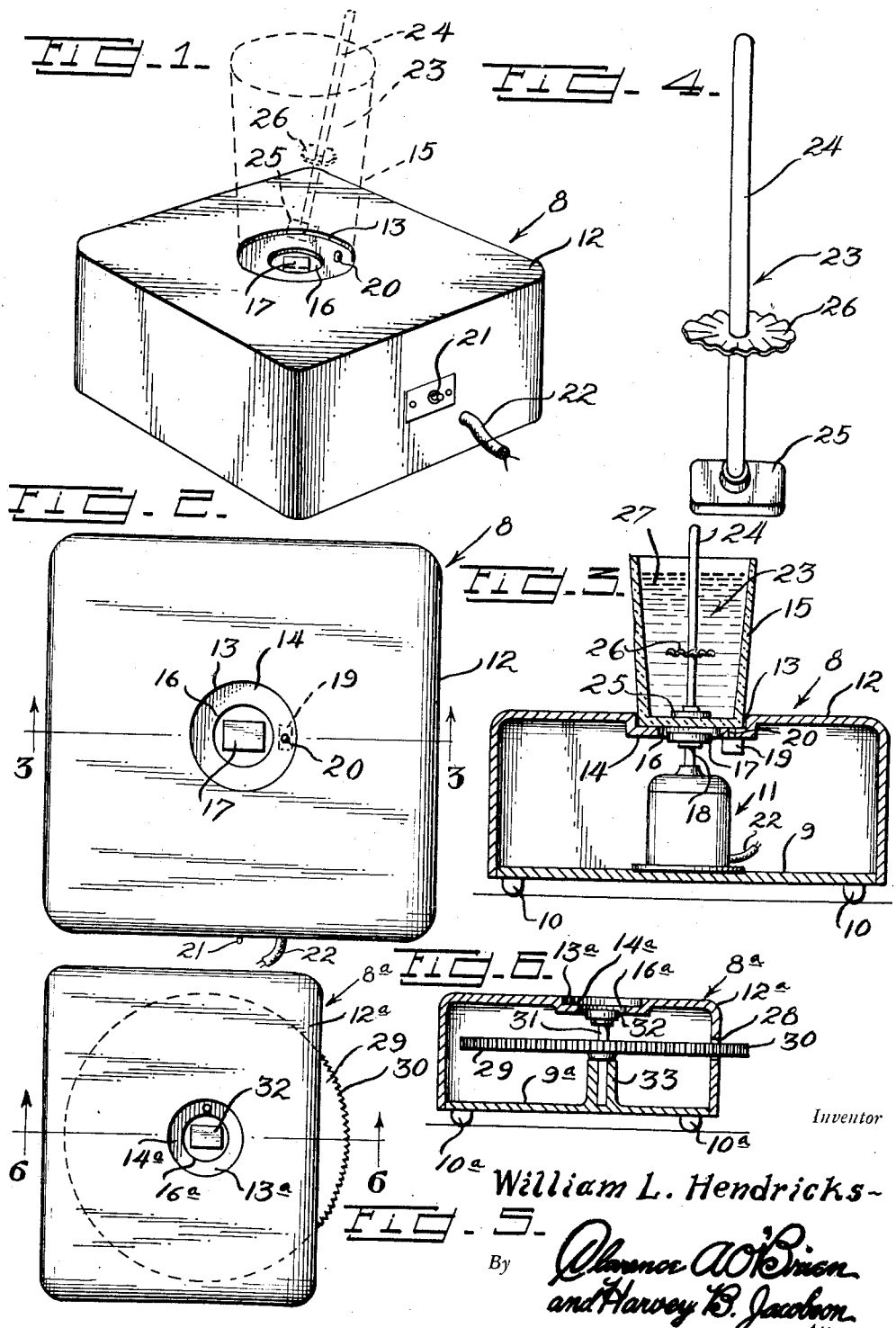
Inventor
William L. Hendricks Patented Jan. 18, 1949

2,459,224

UNITED STATES PATENT OFFICE 2,459,224

MAGNETICALLY OPERATED STIRRER FOR MIXING LIQUIDS

William L. Hendricks, Los Angeles, Calif.

Application August 17, 1946, Serial No. 691,217

2 Claims. (Cl. 259—108)

The present invention relates to a novel and improved liquid stirring and mixing device utilizing complemental magnets and associated means functioning to achieve the results sought.

In carrying out the principles of the invention, I have evolved and produced a liquid mixing stirrer of an unusual and unique type whereby to provide a structure which is both a novelty and a truly utilitarian mixer for adaptable use on beverage bars, in public establishments and for practical use as a household appliance.

In reducing to practice the preferred embodiments of my inventive ideas, I have perfected a simple and ingenious structural adaptation in which the complemental parts have been carefully and properly chosen and in which said parts are properly arranged and coordinated to aptly fulfill the requirements of the invention.

More specifically, the preferred embodiment of the invention, generically speaking, comprises a rotatable magnet housed in an appropriate base, said base being constructed to accommodate and properly seat a drinking glass and said drinking glass being adapted to contain a stirrer, said stirrer being provided with a magnet coacting with and attracted by the first-named magnet, the magnets being simultaneously rotatable, and the stirrer being provided with an agitator for agitating and mixing the liquid in said glass.

The desired results are attained through the medium of two embodiments, one utilizing an electric motor for rotating the primary magnet, and one utilizing a hand wheel, in place of the motor, for optionally rotating said primary magnet.

Other objects, advantages, and features of the invention will become more readily apparent from the following description and the accompanying illustrative drawings.

In the drawings, wherein like numerals are employed to designate like parts throughout the views:

Figure 1 is a perspective view of the preferred embodiment of the magnetically operated stirrer for liquid mixing purposes, this constructed in accordance with the principles of the instant invention and showing one embodiment of the invention.

Figure 2 is a top plan view of Figure 1 with the drinking glass and insertable and removable stirrer removed.

Figure 3 is a central vertical sectional view taken approximately on the plane of the line 3—3 of Figure 2, looking in the direction of the arrows, and showing the drinking glass and stirrer in position for use.

Figure 4 is a perspective view of the agitator-stirrer per se.

Figure 5 is a top plan view, similar to Figure 2, showing a modified form of the invention.

Figure 6 is a section on the plane of the line 6—6 of Figure 5, looking in the direction of the arrows.

Attention is first directed to the motor-included form of embodiment of the invention illustrated in Figures 1 to 3, inclusive. Reference being had to Figure 3, it will be seen that the base, as a unitary structure, is denoted by the numeral 8, the same comprising a suitable base plate 9 with supporting knobs or seats 10. This base plate supports the centrally and vertically positioned electric motor 11, the latter being enclosed within the housing or shell 12. The shell may be of any appropriate material, transparent, or otherwise. The shell is here shown as generally rectangular in form and the top is provided at its central region with a depression 13 having a ledge 14 for the drinking glass 15. The ledge is of annular form and thus defines a central aperture 16 to accommodate the permanent primary magnet 17, the latter being keyed on the rotary motor shaft 18. Incidentally, the numeral 19 designates an appropriate switch (not detailed) having a depressible push-button 20 exposed and extending into the recess 13 so that the same is operated by the weight of the glass when the glass is placed in position shown in Figure 3. This is an optional type of switch, for in Figure 1 a manually-tripped switch 21 is shown. Also, in Figure 1, I illustrate the electric cord or cable 22 which supplies current to the motor. I am not particularly concerned with the construction of the motor, the switch means or method of supplying current.

The stirrer, as a unitary device, is denoted by the numeral 23 and comprises a suitably weighted and proportioned stem or shaft 24 which extends above the mouth of the glass to permit access to be had for ready insertion and removal purposes. The shaft is provided, on its lower end, with a suitably weighted and proportioned permanent magnet 25 which coacts, obviously, with the magnet 17. The latter magnet may be referred to as the primary magnet, and the magnet 25 as the secondary magnet, as is obvious. An appropriate corrugated wafer-like agitator 26 is mounted on the stem at the point indicated, being thus immersed in the water or other liquid 27 in the drinking glass.

When the motor is turned on, and the shaft 18 rotated, the magnet 17 is also rotated. With the glass in position, as shown in Figure 3, and the agitator 23 in place, the magnetic forces from the rotating magnet 17 attracts and spins the secondary magnet 25. The glass stays stationary and the agitator thus spins in the liquid and mixes the same in an obvious manner.

While the device was primarily designed to serve as a unique appliance for advertising and other purposes, it is, nevertheless, a useful appliance in the home, in the public bar, and wherever stirrers and mixers are needed for mixing various drinks.

In the modification seen in Figures 5 and 6, the base is denoted by the numeral 8a, the base plate indicated at 9a and the supporting feet at 10a. The depression is denoted at 13a and the ledge at 14a and the central aperture is indicated at 16a. In this form of the invention, the side wall of the shell or housing 12a is provided with a slot 28 permitting a peripheral portion of the hand-wheel 29 to project therethrough for accessibility. The accessible edge is milled or knurled, as at 30, to permit the disk to be spun by hand. The disk is mounted on a perpendicular shaft 31 which carries the magnet 32, said shaft being journaled for free rotation in an appropriate bearing 33. Here the motion is transmitted to the shaft and magnet by hand, as is obvious. Otherwise, the results are the same, as before explained.

It is submitted that devices of the type herein shown and described are in the nature of innovations, and while it was my original intention, primarily, to provide the trade with a clever novelty possessed of eye appeal and other attending attractive purposes, experience shows that the degree of usefulness of the structure is such as to enable it to perform as a practical liquid stirring mixer.

It is thought that persons skilled in the art to which the invention relates will be able to obtain a clear understanding of the invention after considering the description in connection with the drawings. Therefore, a more lengthy description is regarded as unnecessary.

Minor changes in the shape, size and arrangement of details coming within the field of invention claimed may be resorted to in actual practice, if desired.

Having thus described my invention, what I claim as new and desire to secure by Letters Patent of the United States is:

1. A device of the class described comprising a base plate, a housing on said base plate, said housing being provided with a central depression adapted to accommodate the lower portion of a drinking glass, said depression forming a ledge and said ledge being centrally apertured, a bearing in said housing on said base plate, a shaft mounted for rotation in said bearing, a permanent magnet on the upper end of said shaft located for rotation in said aperture, and a hand wheel mounted on said shaft parallel to and above said base plate, said housing having a slot in one side, and a marginal portion of said wheel projecting through said slot for convenient access and manipulation.

2. A device of the class described comprising a horizontal base plate, a hollow housing mounted on said base plate, said housing being provided in its top with a central depression adapted to seat the basal portion of a conventional-type drinking glass, said depression forming a ledge and said ledge being centrally apertured to expose a rotatable magnet, a shaft mounted for rotation on said base and within said housing and directly beneath the aperture in said ledge, means for rotating said shaft, said shaft being provided on its upper end with a magnet, and said magnet being rotatable in said aperture, and a stirrer removably mounted in the glass, said stirrer comprising a handle accessible through the upper open end of the glass, said handle being provided on its intermediate portion with an agitator, and being provided on its lower end with a magnet situated on the interior of the bottom of said glass and adapted to be located above said first-named magnet, in the manner and for the purposes described.

WILLIAM L. HENDRICKS.

REFERENCES CITED

The following references are of record in the file of this patent:

UNITED STATES PATENTS

| Number | Name | Date |
|---|---|---|
| 1,242,493 | Stringham | Oct. 9, 1917 |
| 2,175,321 | Saffir | Oct. 10, 1939 |
| 2,417,452 | Stiefel | Mar. 18, 1947 |